United States Patent
Yasui

(10) Patent No.: US 9,635,192 B2
(45) Date of Patent: Apr. 25, 2017

(54) FACSIMILE APPARATUS

(71) Applicant: KYOCERA Document Solutions Inc., Osaka (JP)

(72) Inventor: Yoshiaki Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/988,327

(22) Filed: Jan. 5, 2016

(65) Prior Publication Data

US 2016/0205268 A1 Jul. 14, 2016

(30) Foreign Application Priority Data

Jan. 14, 2015 (JP) .................. 2015-004664

(51) Int. Cl.
*G06F 3/12* (2006.01)
*H04N 1/00* (2006.01)

(52) U.S. Cl.
CPC ....... *H04N 1/0001* (2013.01); *H04N 1/00015* (2013.01); *H04N 1/00031* (2013.01); *H04N 1/00076* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0177194 A1* | 8/2007 | Yamaguchi | .......... | H04N 1/0048 358/1.15 |
| 2013/0163024 A1* | 6/2013 | Sato | .................. | H04N 1/00076 358/1.13 |
| 2014/0118794 A1* | 5/2014 | Seo | .................... | H04N 1/00031 358/406 |

FOREIGN PATENT DOCUMENTS

| | | |
|---|---|---|
| JP | H 9-135319 A | 5/1997 |
| JP | 2001-194962 A | 7/2001 |
| JP | 2008-11353 A | 1/2008 |

OTHER PUBLICATIONS

Japanese Office Action dated Sep. 28, 2016, issued by the Japanese Patent Office in corresponding application JP 2015-004664.

* cited by examiner

*Primary Examiner* — John Wallace
(74) *Attorney, Agent, or Firm* — Stein IP, LLC

(57) ABSTRACT

A facsimile apparatus includes an accepting portion, a communication portion, a control portion, and a display portion, wherein when the accepting portion accepts a change of a set content of a predetermined set item that is a set item which makes it impossible to perform the facsimile communication if the set content is incorrect, the control portion forces the display portion to display test request information for prompting execution of a test communication with the set content of the predetermined set item changed.

3 Claims, 8 Drawing Sheets

FACSIMILE APPARATUS

INCORPORATION BY REFERENCE

The present application is based on Japanese Patent Application No. 2015-004664 filed on Jan. 14, 2015, the contents of which are hereby incorporated by reference.

BACKGROUND

The present disclosure relates to a facsimile apparatus.

A facsimile apparatus stores a set item relevant to facsimile communication and a set content of the set item. And, the facsimile apparatus executes the facsimile communication based on the set content of the set item stored in the facsimile apparatus itself.

There are a plurality of set items relevant to the facsimile communication. As to the plurality of set items, their set contents can be changed. For example, it is possible to perform setting in such a manner that sender information (name, dial number and the like) is printed on an output sheet of another machine at the other end of the line and possible to set the number of calls before a time of receiving facsimile data.

SUMMARY

A facsimile apparatus according to a first aspect of the present disclosure includes an accepting portion, a communication portion, a control portion, and a display portion. The accepting portion accepts setting of a set content relevant to facsimile communication. The communication portion executes the facsimile communication. The control portion controls the facsimile communication executed by the communication portion and determines whether a communication error occurs during an execution time of the facsimile communication or not. The display portion displays information. And, when the accepting portion accepts a change of a set content of a predetermined set item that is a set item which makes it impossible to perform the facsimile communication if the set content is incorrect, the control portion forces the display portion to display test request information for prompting execution of a test communication with the set content of the predetermined set item changed.

A facsimile apparatus according to a second aspect of the present disclosure includes an accepting portion, a communication portion, a control portion, and a display portion. The accepting portion accepts setting of a set content relevant to facsimile communication. The communication portion executes the facsimile communication. The control portion controls the facsimile communication executed by the communication portion and determines whether a communication error occurs during an execution time of the facsimile communication or not. The display portion displays information. And, after the accepting portion accepts a change of a set content of a predetermined set item that is a set item which makes it impossible to perform the facsimile communication if the set content is incorrect, in a case where the communication error occurs in the facsimile communication that is executed first, or in a case where the communication errors occur successively by a predetermined number of times after the communication error occurs in the facsimile communication that is executed first, the control portion forces the display portion to display reset request information for prompting a reset of the set content after the change of the predetermined set item.

A facsimile apparatus according to a third aspect of the present disclosure includes an accepting portion, a communication portion, a control portion, a history information storing portion, and a display portion. The accepting portion accepts setting of a set content relevant to facsimile communication. The communication portion executes the facsimile communication. The control portion controls the facsimile communication executed by the communication portion and determines whether a communication error occurs during an execution time of the facsimile communication or not. The history information storing portion stores history information that indicates an execution history of the facsimile communication. The display portion displays information. And, when the accepting portion accepts a change of a set content of a predetermined set item that is a set item which makes it impossible to perform the facsimile communication if the set content is incorrect, the control portion checks an execution history of the facsimile communication that was executed in times past, and in a case where a communication error occurred in the facsimile communication executed immediately before the accepting portion accepts the change of the set content of the predetermined set item, or in a case where a predetermined number of the communication errors had occurred successively before the communication error occurred in the facsimile communication executed immediately the before the accepting portion accepts the change of the set content of the predetermined set item, the control portion determines that a predetermined condition is met and permits the change of the set content of the predetermined set item.

DETAILED DESCRIPTION

Hereinafter, as to a facsimile apparatus according to an embodiment of the present disclosure, a multi-function machine, which incorporates a plurality of kinds of functions such as a facsimile function and the like, is described as an example.

<Whole Structure of Multi-function Machine>

Figure 1:
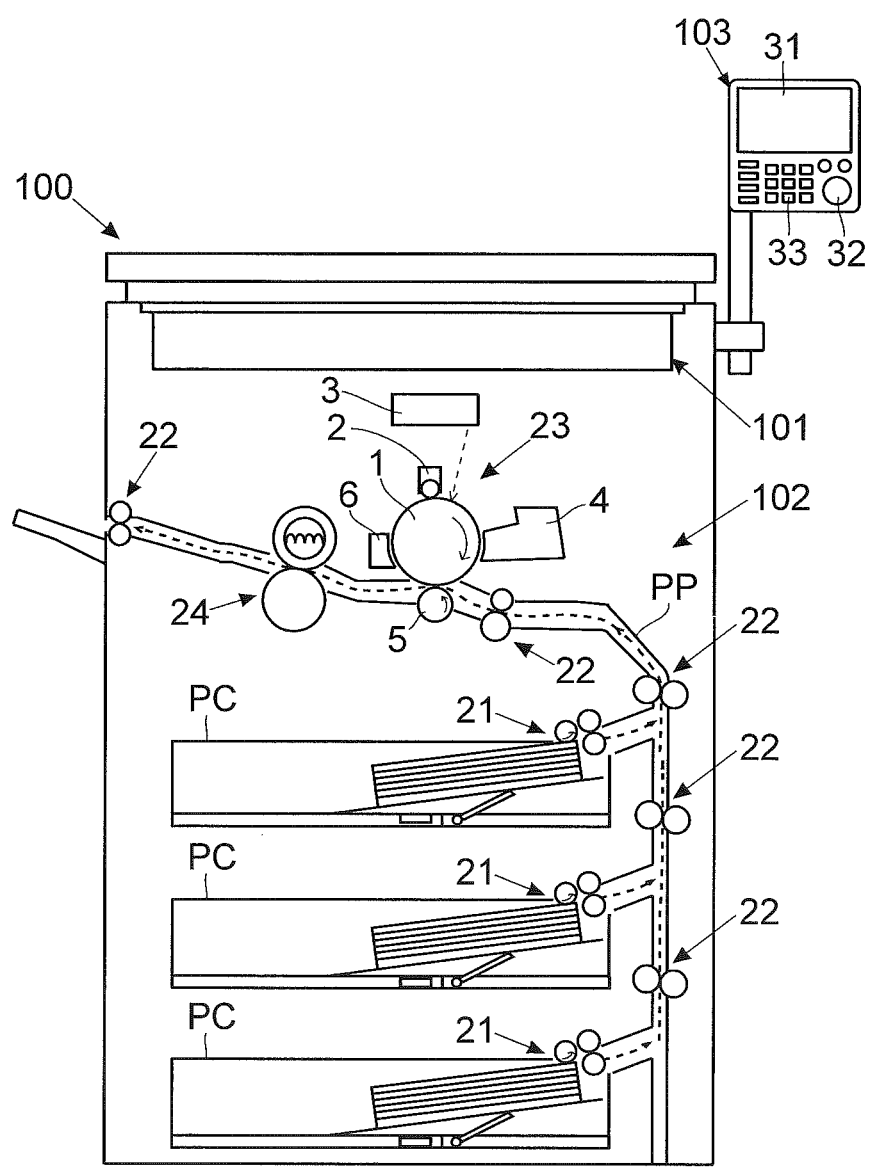
FIG. 1 is a schematic view of a multi-function machine (a facsimile apparatus) according to an embodiment of the present disclosure.

As shown in FIG. 1, a multi-function machine 100 includes an image reading portion 101, a printing portion 102, and an operating panel 103. In the meantime, the multi-function machine 100 corresponds to a "facsimile apparatus."

The image reading portion 101 reads a document to generate image data of the document. For example, the image data of the document obtained by the reading of the document by the image reading portion 101 undergo various kinds of processes by a main control portion 110 (see FIG. 2) described later. And, the image data become base data of facsimile data. Or, the image data become base data of an image printed by the printing portion 102.

The printing portion 102 is composed of a sheet feeding portion 21, a sheet conveying portion 22, an image forming portion 23, and a fixing portion 24. The sheet feeding portion 21 supplies sheets stored in a sheet cassette PC to a sheet conveying path PP. The sheet conveying portion 22 conveys the sheets along the sheet conveying path PP. The image forming portion 23 includes a photosensitive drum 1, an electrifying device 2, a light exposing device 3, a developing device 4, a transfer roller 5, and a cleaning device 6. And, the image forming portion 23 forms a toner image based on image data and transfers the toner image to a sheet. The fixing portion 24 heats and presses the toner image transferred to the sheet to fix the toner image.

The operating panel 103 includes a liquid crystal display panel 31 having a touch panel. The liquid crystal display panel 31 displays software keys and messages for accepting various kinds of settings. Besides, the operating panel 103 is provided with hardware keys such as a start key 32, a ten-key pad 33 and the like. In the meantime, the operating panel 103 corresponds to an "accepting portion" and a "display portion."

<Hardware Structure of Multi-function Machine>

Figure 2:
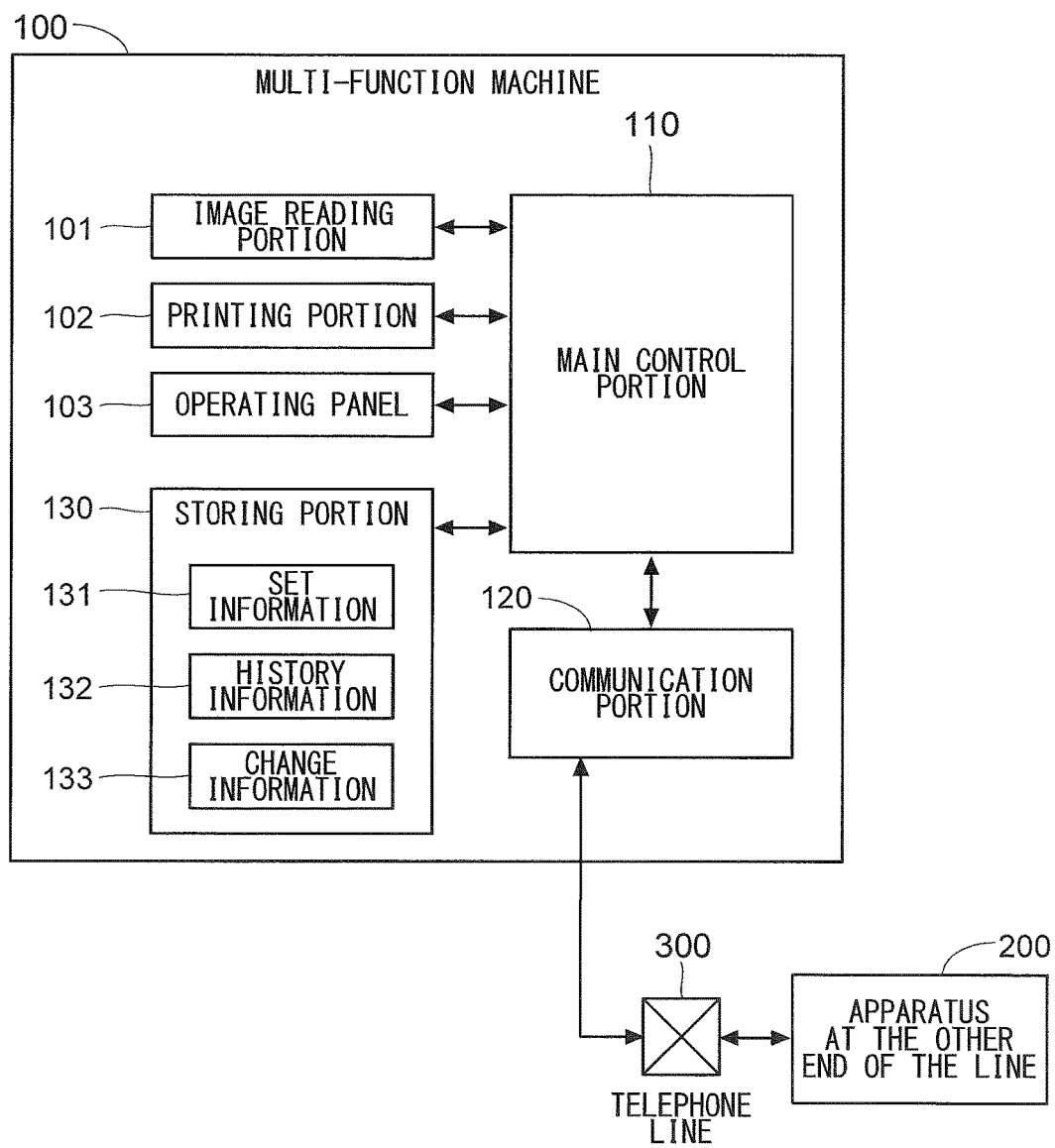
FIG. 2 is a block diagram showing an example of a hardware structure of a multi-function machine according to an embodiment of the present disclosure.

As shown in FIG. 2, the multi-function machine 100 includes the main control portion 110 (which corresponds to a "control portion"). The main control portion 110 includes a CPU, an ASIC for image processing, and storing portions (ROM, RAM and the like). And, the main control portion 110 performs whole control of the multi-function machine 100 based on a control program and data that are stored in the storing portion. For example, the main control portion 110 applies various kinds of processes (enlargement/reduction, concentration conversion, data format conversion and the like) to image data. Besides, the main control portion 110 controls a reading operation of the image reading portion 101 and a printing operation of the printing portion 102. Further, the main control portion 110 controls a display operation of the operating panel 103 and detects an operation performed on the operating panel 103.

Besides, the main control portion 110 is connected to a communication portion 120 to control various kinds of communications executed by the communication portion 120. The communication portion 120 incorporates a modem and the like, for example. And, the communication portion 120 executes facsimile communication with an apparatus 200 (facsimile apparatus) at the other end of the line via an exchange 300 (telephone line).

Besides, the main control portion 110 is connected to a storing portion 130. The storing portion 130 stores set information 131 that indicates an execution condition (the current set content for the facsimile communication) for the facsimile communication. And, the main control portion 110 controls the facsimile communication executed by the communication portion 120 based on the set content indicated by the set information 131.

The storing portion 130 stores history information 132 as well that indicates an execution history of the facsimile communication. For example, the history information 132 is information that indicates an execution time (time and date) of the facsimile communication, names of a sender and receiver of facsimile data, and success or failure (whether the facsimile communication is ended normally or not) of the facsimile communication. And, the main control portion 110 updates the history information 132 each time the facsimile communication is executed by the communication portion 120. In the meantime, in this structure, the storing portion 130 corresponds to a "history information storing portion."

<Facsimile Communication>

(Overview)

In transmission of facsimile data in the facsimile communication, first, a document is set on the multi-function machine 100. And, an execution command for the facsimile communication is performed on the operating panel 103 (start key 32 is pushed down).

When the operating panel 130 accepts the execution command for the facsimile communication, the main control portion 110 forces the image reading portion 101 to perform reading of the document and generates facsimile data based on image data of the document obtained by the reading. Thereafter, the main control portion 110 forces the communication portion 120 to transmit the facsimile data to the other apparatus 200. Besides, when the communication portion 120 transmits the facsimile data, the main control portion 110 updates the history information 132.

In reception of the facsimile data in the facsimile communication, the communication portion 120 receives facsimile data from the other apparatus 200. When the communication portion 120 receives the facsimile data, the main control portion 110 forces the storing portion 130 to store the facsimile data temporarily. Further, when the communication portion 120 receives the facsimile data, the main control portion 110 updates the history information 132. And, the main control portion 110 applies various kinds of processes to the facsimile data and forces the printing portion 102 to perform printing based on the facsimile data.

<Predetermined Set Item>

In the facsimile communication, there are a plurality of set items whose set content can be changed. The operating panel 103 accepts setting (change) of a set content for the facsimile communication.

When the operating panel 103 accepts a change of a set content for the facsimile communication, the main control portion 110 updates the set information 131, which defines an execution condition (the current set content for the facsimile communication) for the facsimile communication, based on the set content accepted by the operating panel 103. Accordingly, in this case, the facsimile communication is executed based on the set content after the change.

However, there is a case where a change of a set content for the facsimile communication is not accepted. In this case, the set information 131 is not updated. Accordingly, the facsimile communication is continued based on the previous setting (details are described later).

Besides, when the operating panel 103 accepts a change of a set content for the facsimile communication, the main control portion 110 updates the set information 131 and change information 133 as well. The change information 133 is information that indicates a set item whose change of the set content is accepted by the operating panel 103, a set content of the predetermined set item of before the change, a time (time and date) when the set content of the set item was changed. In the meantime, the change information 133 is stored in the storing portion 130. In this structure, the storing portion 130 corresponds to a "change information storing portion."

Here, the plurality of set items relevant to the facsimile communication are classified into: set items (hereinafter, there is a case of being suitably called a predetermined set item) that make it impossible to perform the facsimile communication if their set contents are incorrect; and set items other than the predetermined set item. As examples of the predetermined set item, there are "line set", "dial-in set", and "dial number display set" and the like. In the meantime, there are many set items other than the predetermined set item. As examples, there are a set item relevant to sender information (name, dial number and the like) printed on an output sheet of the other apparatus 200, a set item relevant to the number of calls at a time of receiving the facsimile data and the like.

The "line set" is a set item relevant to the transmission of the facsimile data, that is, a set item relevant to a kind (dial signal type) of a dial signal sent to the exchange 300. In this "line set", it is set whether a DTMF signal should be sent to the exchange 300 or a dial pulse signal should be sent to the exchange 300.

The "dial-in set" and "dial number display set" are set items relevant to the reception of the facsimile data. In the "dial-in set", it is set whether a dial-in process should be executed at a receiving time of the facsimile data or not. In the "dial number display set", it is set whether a dial number display process should be executed at a receiving time of the facsimile data or not.

In a case where the set contents of these predetermined set items are set to incorrect set contents, a communication error occurs. As a result, the facsimile communication becomes impossible to be executed.

For example, in the "line set", as to which one of a DTMF signal system and a dial pulse signal system should be set, it is decided based on an agreement signed by a user and a communication business that provides a telephone line. In a case where the agreement is signed to use a telephone line of the dial pulse signal system, if the "line set" is mistakenly set to the DTMF signal system, the exchange 300 is unable to recognize a dial signal (DTMF signal) from the multi-function machine 100. In this case, a T0 time out error occurs which is one of the communication errors. In the meantime, the T0 time out error is an error that occurs when 60 seconds elapse without receiving a signal from the other apparatus 200.

Besides, also as to how the "dial-in set" and "dial number display set" should be set, it is decided based on the agreement signed by the user and the communication business that provides the telephone line. In a case where the set contents of the "dial-in set" and "dial number display set" are incorrect, the connection with the other apparatus 200 becomes unable and a T1 time out error occurs which is one of the communication errors. In the meantime, the T1 time out error is an error that occurs when 35 seconds elapse without receiving a signal from the other apparatus 200.

(First Embodiment)

In a first embodiment, to alleviate occurrence of a communication error caused by the change of the set content of the predetermined set item, when the change of the set content of the predetermined set item is accepted, the user is prompted to execute a test communication. Hereinafter, the first embodiment is specifically described with reference to a flow chart shown in FIG. 3.

Figure 3:
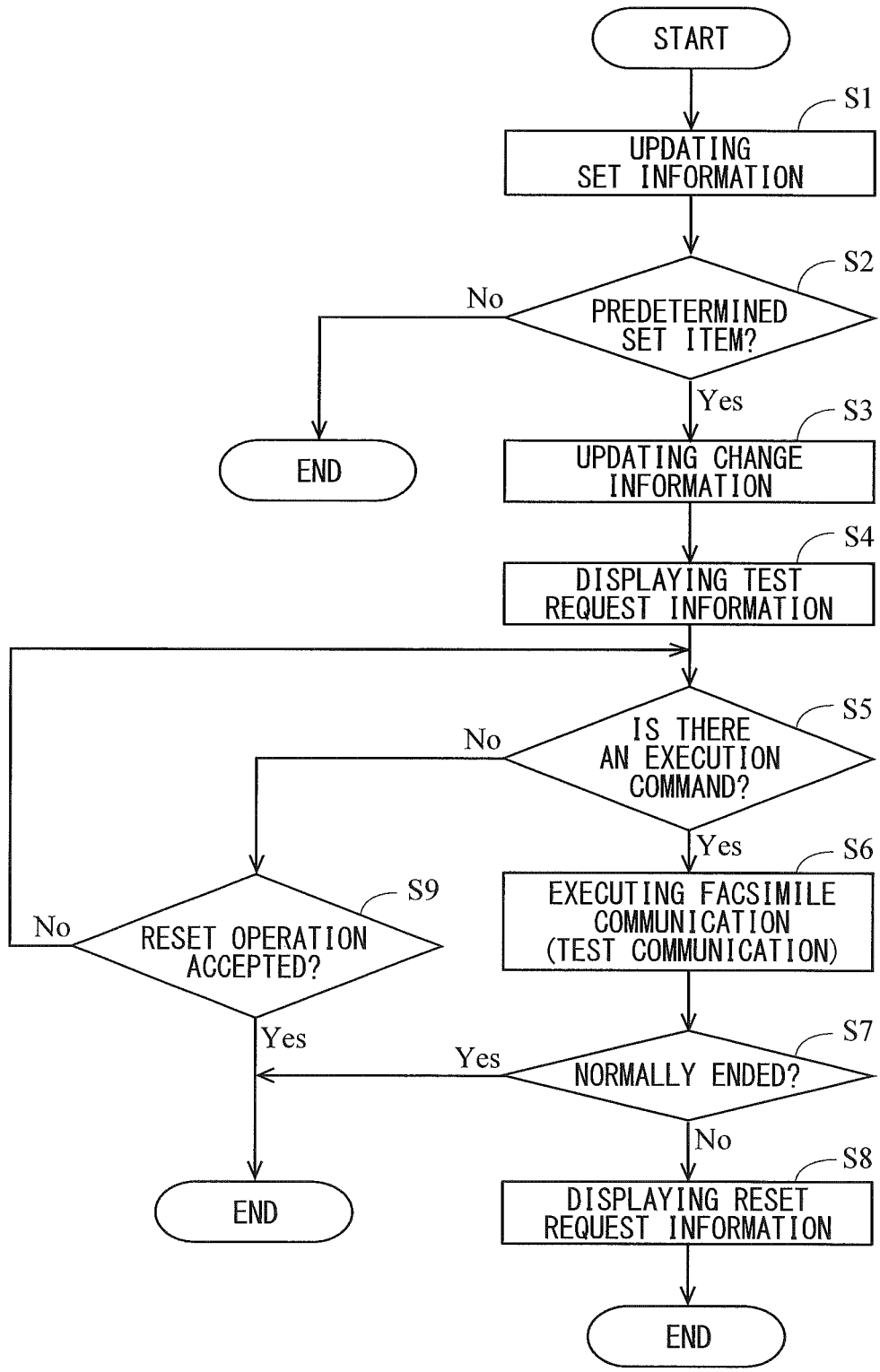
FIG. 3 is a flow chart for describing a procedure flow when a multi-function machine according to an embodiment of the present disclosure accepts a change of a set content relevant to facsimile communication.

First, the flow chart shown in FIG. 3 starts when the operating panel 103 accepts a change of a set content for the facsimile communication.

In a step S1, the main control portion 110 updates the set information 131. Besides, in a step S2, the main control portion 110 determines whether the change target is the predetermined set item or not. As a result of this determination, if it is found out that the change target is the predetermined set item, the flow goes to a step S3. In the meantime, in the step S2, in a case where the main control portion 110 determines that the change target is not the predetermined set item, the present flow ends.

In the case of going to the step S3, the main control portion 110 updates the change information 133. In other words, the main control portion 110 forces the storing portion 130 to store the predetermined set item whose set content is changed, the set content of the predetermined set item before the change, and the time (time and date) when the set content of the predetermined set item is changed.

Figure 4:
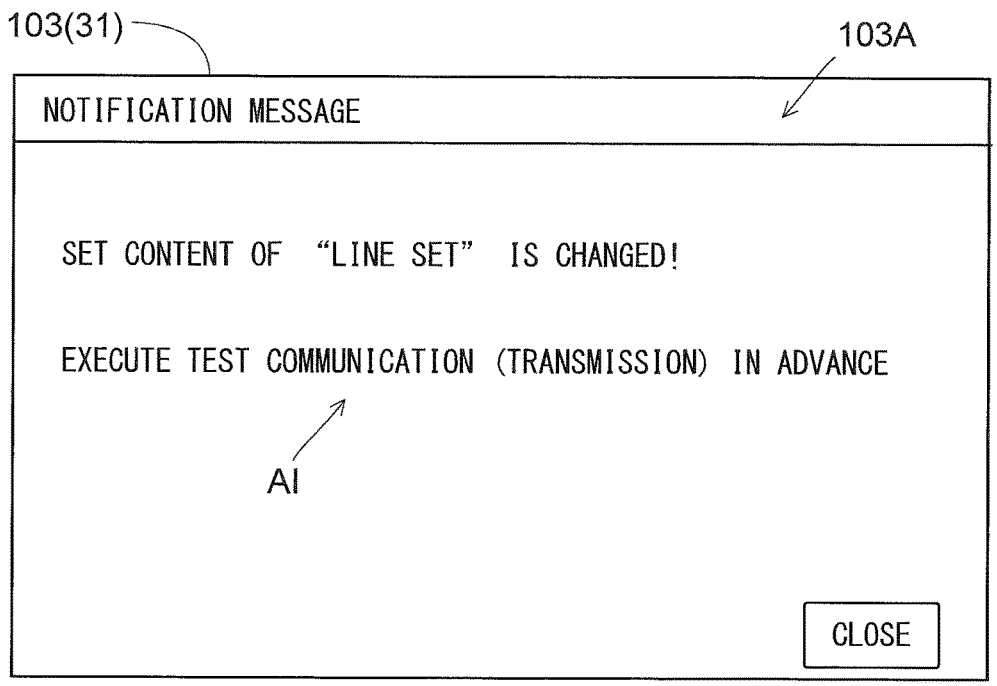
FIG. 4 is a view showing an example of an notification screen (test request information) displayed on a multi-function machine according to an embodiment of the present disclosure.
Figure 5:
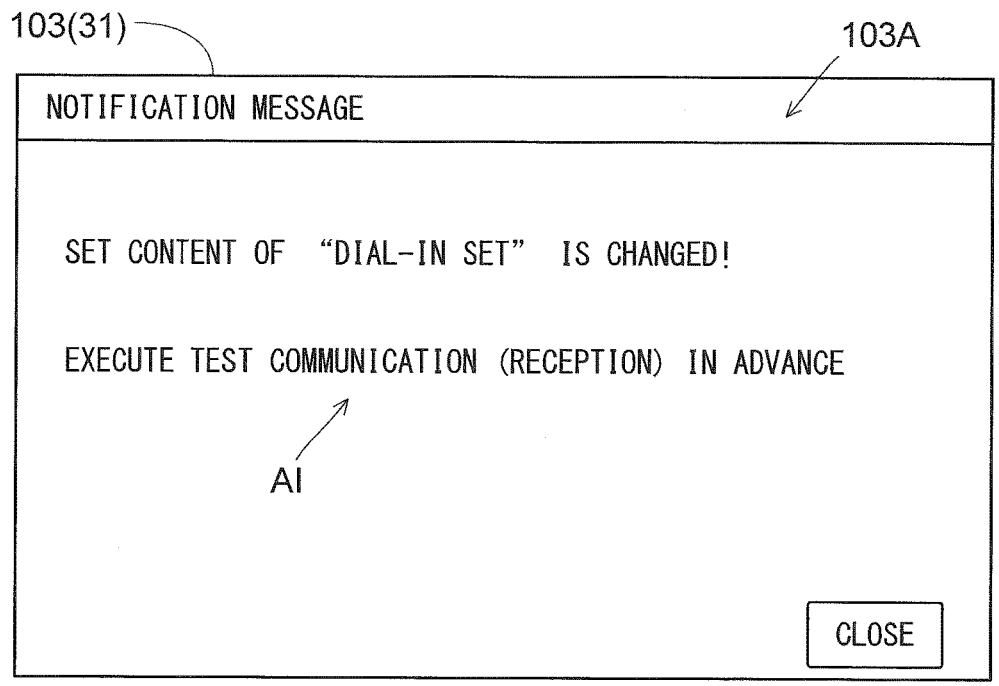
FIG. 5 is a view showing an example of an notification screen (test request information) displayed on a multi-function machine according to an embodiment of the present disclosure.

Next, in a step S4, the main control portion 110 forces the operating panel 103 to display a notification screen 103A shown in FIG. 4 or FIG. 5. The notification screen 103A displays test request information AI for prompting execution of the test communication with the set content of the predetermined set item changed.

For example, in a case where the "line set" as the predetermined set item is the change target, as shown in FIG. 4, the operating panel 103 displays, as the test request information AI, text information "The set content of the "line set" is changed. Execute the test communication (transmission) in advance." in the notification screen 103A. Besides, in a case where as the predetermined set item, the "dial-in set" or the "dial number display set" is the change target, as shown in FIG. 5 (as an example, the "dial-in set" is targeted), the operating panel 103 displays, as the test request information AI, text information "The set content of the "dial-in set" is changed. Execute the test communication (reception) in advance." in the notification screen 103A.

Then, in a step S5, the main control portion 110 determines whether the operating panel 103 accepts an execution command for the facsimile communication or not. As a result of this determination, if it is found out that the operating panel 103 accepts an execution command for the facsimile communication, the flow goes to a step S6. And, going to the step S6, the main control portion 110 instructs the communication portion 120 to execute the facsimile communication. In the meantime, the main control portion 110 recognizes the facsimile communication executed here as the test communication.

Thereafter, in a step S7, the main control portion 110 determines whether the facsimile communication (test communication) is normally ended or not. As a result of this determination, if it is found out that the facsimile communication (test communication) is not normally ended, the flow goes to a step S8.

Figure 6:
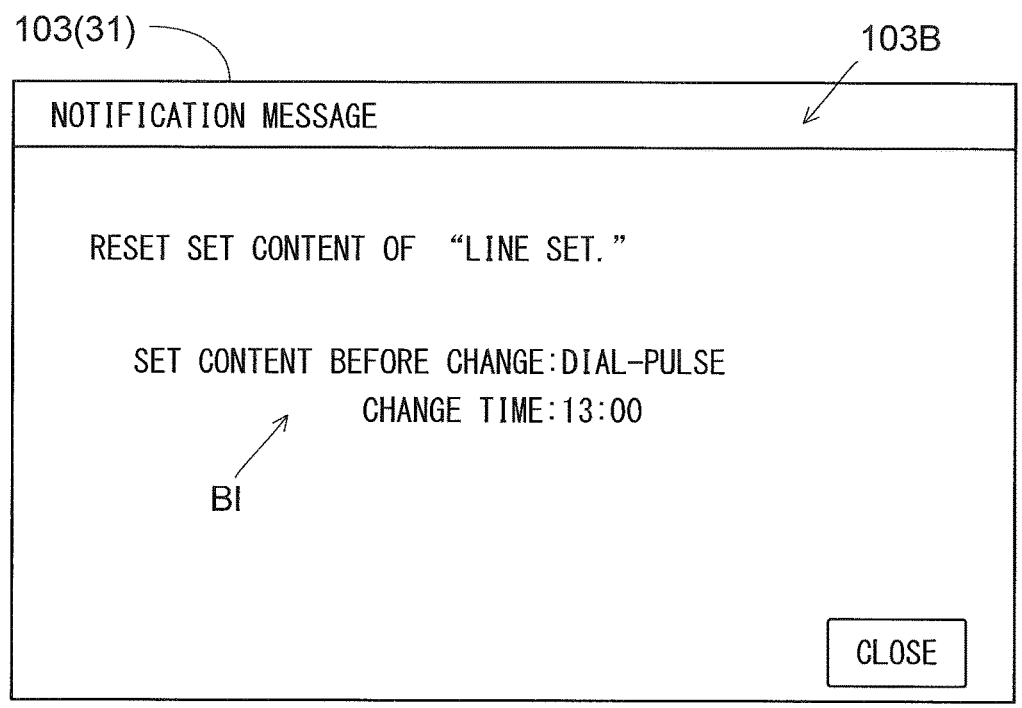
FIG. 6 is a view showing an example of an notification screen (reset request information) displayed on a multi-function machine according to an embodiment of the present disclosure.

Going to the step S8, the main control portion 110 forces the operating panel 103 to display a notification screen 103B shown in FIG. 6. The notification screen 103B displays reset request information BI for prompting a reset of the set content of the predetermined set item after the change. For example, as shown in FIG. 6 (as an example, the "line set" is targeted), the operating panel 103 displays, as the reset request information BI, text information "Reset the set content of the "line set." in the notification screen 103B. In other words, the operating panel 103 displays, as the reset request information BI, the predetermined set item, whose set content is changed, in the notification screen 103A. Besides, also the operating panel 103 displays, in the notification screen 103B, as the reset request information BI, the set content of the predetermined set item before the change and the time (time and date) when the set content of the predetermined set item is changed.

On the other hand, in the step S7, in a case where the main control portion 110 determines that the facsimile communication (test communication) is normally ended, the present flow ends. In this case, the main control portion 110 validates the set content of the predetermined set item after the change and waits for an execution command for the next facsimile communication with the set content of the predetermined set item changed. In the meantime, in this case, the notification screen 103B (reset request information BI) is not displayed on the operating panel 103. And, during this time, if an execution command for the facsimile communication is performed, the facsimile communication is executed with the set content of the predetermined set item changed.

In the meantime, in the step S5, in a case where the main control portion 110 determines that the operating panel 103 does not accept an execution command for the facsimile communication, the flow goes to a step S9. Going to the step S9, the main control portion 110 determines whether the operating panel 103 accepts a reset operation for resetting the set content after the change or not. As a result of this determination, if it is found out that the operating panel 103 accepts a reset operation, the main control portion 110 resets the set content after the change (returns the changed set content to the set content before the change). And, the present flow ends. On the other hand, in the step S9, in a case where the main control portion 110 determines that the operating panel 103 does not accept a reset operation, the determination in the step S5 is repeated.

In the first embodiment, as described above, when the operating panel 103 accepts the change of the set content of the predetermined set item, the main control portion 110 forces the operating panel 103 to display the test request information AI (notification screen 103A) for prompting the execution of the test communication with the set content of the predetermined set item changed.

In the structure of the first embodiment, if the set content of the predetermined set item is changed, the test request information AI is displayed to let the user execute the test communication. In other words, the user checks whether the set content of the predetermined set item is incorrect or not. As a result of this test communication, if the test communication does not end normally and a communication error occurs, the user determines that it is highly likely that the set content of the predetermined set item is incorrect, and the user resets the set content of the predetermined set item. In this way, it is possible to alleviate occurrence of a communication error caused by the incorrect set content of the predetermined set item.

Besides, in the first embodiment, as described above, in the case where the test communication ends normally, the main control portion 110 validates the set content of the predetermined set item after the change. On the other hand, in the case where the test communication does not end normally, the main control portion 110 forces the operating panel 103 to display the reset request information BI (notification screen 103B) for prompting the reset of the set content of the predetermined set item. As described above, according to the structure in which in the case where the test communication does not end normally (it is highly likely that the set content of the predetermined set item is incorrect), the reset request information BI is displayed, the user can surely check whether the set content of the predetermined set item is incorrect or not. In other words, if the set content of the predetermined set item is incorrect, the user can surely reset the set content of the predetermined set item.

Besides, in the first embodiment, as described above, the main control portion 110 forces the operating panel 103 to display, as the reset request information BI, the predetermined set item whose change of the set content is accepted by the operating panel 103 and the set content of the predetermined set item before the change. According to this structure, the user can easily recognize the predetermined set item to be reset, besides, the user can recognize what kind of set content the predetermined set item should be reset to.

(Second Embodiment)

In a second embodiment, after the set content of the predetermined set item is changed, an execution status of the facsimile communication, which is executed with the set content after the change, is monitored. As a result of this, if it is found out that a first condition is met, the user is prompted to reset the set content of the predetermined set item after the change. Hereinafter, the second embodiment is specifically described with reference to a flow chart shown in FIG. 7.

Figure 7:
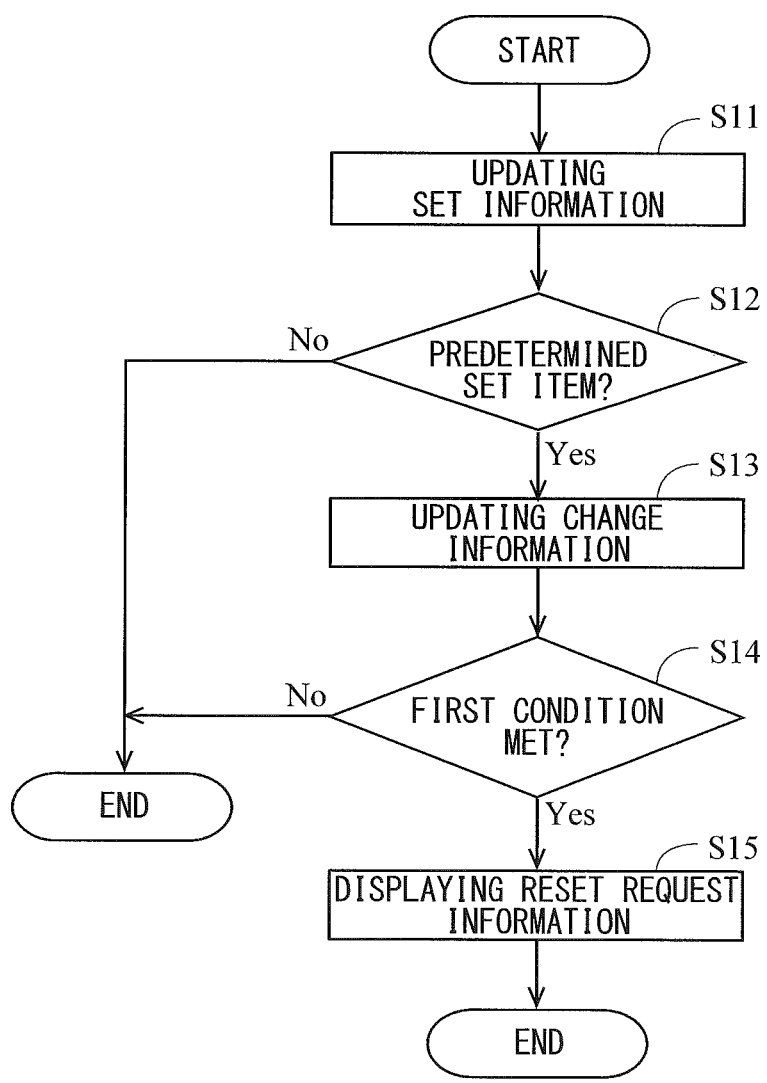
FIG. 7 is a flow chart for describing a procedure flow when a multi-function machine according to an embodiment of the present disclosure accepts a change of a set content relevant to facsimile communication.

First, the flow chart shown in FIG. 7 starts when the operating panel 103 accepts a change of a set content for the facsimile communication.

In a step S11, the main control portion 110 updates the set information 131. Besides, in a step S12, the main control portion 110 determines whether the change target is the predetermined set item or not. As a result of this determination, if it is found out that the change target is the predetermined set item, the flow goes to a step S13. In the meantime, in the step S12, in a case where the main control portion 110 determines that the change target is not the predetermined set item, the present flow ends.

In the case of going to the step S13, the main control portion 110 updates the change information 133. In other words, the main control portion 110 forces the storing portion 130 to store the predetermined set item whose set content is changed, the set content of the predetermined set item before the change, and the time (time and date) when the set content of the predetermined set item was changed.

Next, in a step S14, the main control portion 110 determines whether the first condition is met or not. Here, in a case where a communication error occurs in the facsimile communication executed first after the operating panel 103 accepts the change of the set content of the predetermined set item, the main control portion 110 determines that the first condition is met. In other words, in this case, if a communication error does not occur in the facsimile communication executed first after the operating panel 103 accepts the change of the set content of the predetermined set item, it is determined that the first condition is not met.

Or, in a case where communication errors occur successively by a predetermined number of times (e.g., 2 or 3) after a communication error occurs in the facsimile communication executed first after the operating panel 103 accepts the change of the set content of the predetermined set item, the main control portion 110 determines that the first condition is met. In other words, in this case, even if a communication error occurs in the facsimile communication executed first after the set content of the predetermined set item is changed, if a communication error does not occur in the facsimile communication executed next, it is determined that the first condition is not met.

Here, in a case where a communication error occurs after the set content of the predetermined set item is changed, it is highly likely that the set content of the predetermined set item after the change is incorrect. Because of this, in the step S14, if the main control portion 110 determines that the first condition is met, the flow goes to a step S15. And, going to the step S15, the main control portion 110 forces the operating panel 103 to display the same information as the reset request information BI (notification screen 103B) shown in FIG. 6. In other words, the first condition is a condition that serves as a criterion for deciding whether the reset request information BI should be displayed or not.

On the other hand, in a case where the main control portion 110 determines in the step S14 that the first condition is not met, the present flow ends. In this case, the main control portion 110 validates the set content of the predetermined set item after the change and waits for an execution command for the next facsimile communication with the set content of the predetermined set item changed. In this way, the subsequent facsimile communication is executed with the set content of the predetermined set item changed. In the meantime, in this case, the notification screen 103B (reset request information BI) is not displayed on the operating panel 103.

In the second embodiment, as described above, after the operating panel 103 accepts the change of the set content of the predetermined set item, in the case where a communication error occurs in the facsimile communication executed first, or in the case where communication errors occur successively by a predetermined number of times after a communication error occurs in the facsimile communication executed first, the main control portion 110 forces the operating panel 103 to display the reset request information BI (notification screen 103B) for prompting the reset of the set content of the predetermined set item after the change.

In the structure of the second embodiment, in the case where a communication error occurs in the facsimile communication executed first after the set content of the predetermined set item is changed, the reset request information BI is displayed. Here, in the case where a communication error occurs in the first facsimile communication after the set content of the predetermined set item is changed, it is highly likely that the set content of the predetermined set item is incorrect. Accordingly, in this case, if the reset request information BI is displayed, the user checks whether the set content of the predetermined set item is incorrect or not. And, if the set content of the predetermined set item is incorrect, the set content of the predetermined set item is reset by the user. In this way, it is possible to alleviate occurrence of a communication error caused by the incorrect set content of the predetermined set item.

In the meantime, a communication error occurs in a case as well where there is a miss-input of a fax number. In other words, even if a communication error occurs, there is a case where a communication error does not occur after the correct fax number is input. In this case, it is not necessary to change the set content of the predetermined set item. But, if the set content of the predetermined set item is incorrect, a communication error continues to occur even after the correct fax number is input. Because of this, in the case where a plurality of communication errors occur successively after a communication error occurs in the facsimile communication executed first after the operating panel 103 accepts the change of the set content of the predetermined set item, it is more desirable that the reset request information BI is displayed to prompt the reset of the set content of the predetermined set item after the change.

Besides, as described above, in the second embodiment, like the first embodiment, the predetermined set item whose change of the set content is accepted by the operating panel 103 and the set content of the predetermined set item before the change are displayed as the reset request information BI. According to this structure, the user can easily recognize the predetermined set item to be reset, besides, the user can recognize what kind of set content the predetermined set item should be reset to.

(Third Embodiment)

In a third embodiment, when a change of a set content of the predetermined set item is accepted, an execution history of facsimile communications executed in times past is checked. And, if a second condition (which corresponds to a "predetermined condition") is met, the change of the set content of the predetermined set item is permitted, but if the second condition is not met, the change of the set content of the predetermined set item is not permitted. Hereinafter, the third embodiment is specifically described with reference to a flow chart shown in FIG. 8.

Figure 8:
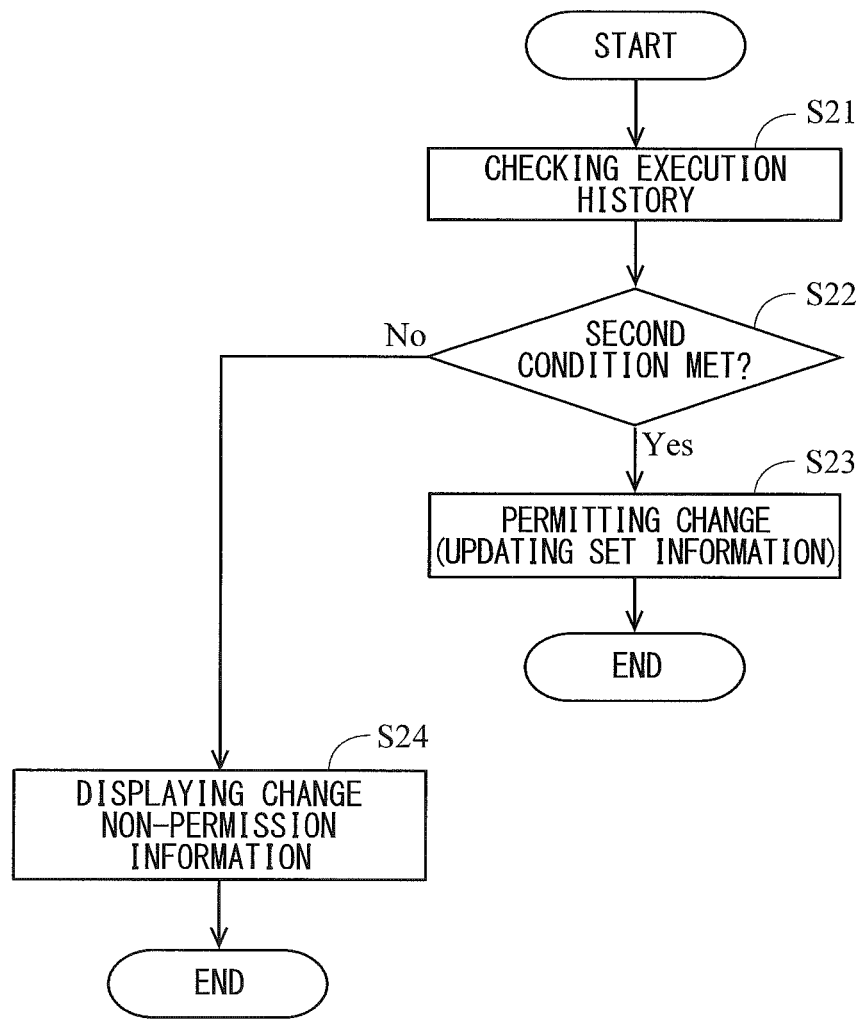
FIG. 8 is a flow chart for describing a procedure flow when a multi-function machine according to an embodiment of the present disclosure accepts a change of a set content relevant to facsimile communication.

First, the flow chart shown in FIG. 8 starts when the operating panel 103 accepts a change of a set content of the predetermined set item.

In a step S21, based on the history information 132, the main control portion 110 checks an execution history of the facsimile communications executed in times past. And, in a step S22, the main control portion 110 determines whether the second condition is met or not. Here, in a case where a communication error occurred in the facsimile communication executed immediately before the operating panel 103 accepts the change of the set content of the predetermined set item, the main control portion 110 determines that the second condition is met. In other words, in this case, when the change of the set content of the predetermined set item is accepted, if it is found out that a communication error did not occur in the facsimile communication executed immediately before, it is determined that the second condition is not met.

Or, in a case where communication errors had occurred successively by a predetermined number of times (e.g., 2 or 3) in the facsimile communication before a communication error occurred in the facsimile communication executed immediately before the operating panel 103 accepts the change of the set content of the predetermined set item, the main control portion 110 determines that the second condition is met. In other words, in this case, when the change of the set content of the predetermined set item is accepted, even if it is found out that a communication error occurred in the facsimile communication executed immediately before, if it is found out that a communication error did not occur in one more previous facsimile communication, it is determined that the second condition is not met.

Here, if the set content of the predetermined set item is incorrect and the facsimile communication is executed with the incorrect set content, a communication error occurs. Accordingly, in this case, it is necessary to change (reset) the set content of the predetermined set item. Because of this, in the step S22, if the main control portion 110 determines that the second condition is met, the flow goes to a step S23. And, going to the step S23, the main control portion 110 permits the change of the set content of the predetermined set item.

In other words, the main control portion 110 updates the set information 131 based on the set content accepted by the operating panel 103.

On the other hand, if the set content of the predetermined set item is correct, a communication error does not occur. In this case, it is not necessary to change the set content of the predetermined set item, preferably should not be changed (to the contrary, if the set content of the predetermined set item is changed, there is a risk that a communication error would occur). Because of this, in the step S22, if the main control portion 110 determines that the second condition is not met, the flow goes to a step S24.

Figure 9:
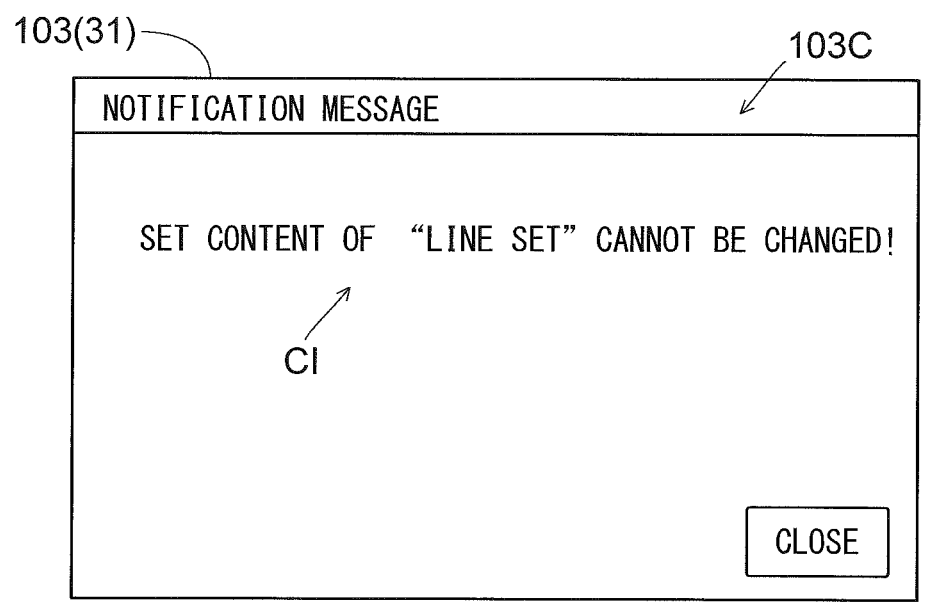
FIG. 9 is a view showing an example of an notification screen (change non-permission information) displayed on a multi-function machine according to an embodiment of the present disclosure.

Going to the step S24, the main control portion 110 forces the operating panel 103 to display a notification screen 103C shown in FIG. 9. This notification screen 103C displays change non-permission information CI for notifying that the change of the set content of the predetermined set item is not permitted. For example, as shown in FIG. 9 (as an example, the "line set" is targeted), the operating panel 103 displays, as the change non-permission information CI, text information "The set content of the "line set" cannot be changed." in the notification screen 103C. In other words, the second condition is a condition that serves as a criterion for deciding whether the change non-permission information CI should be displayed or not.

In the meantime, there is a case where the set content of the predetermined set item is changed from a default based on an agreement on a telephone line after the multi-function machine 100 is delivered. The change of the set content in this case is usually performed before the first facsimile communication is executed. Because of this, even in a case where it is found out that the facsimile communication was not executed in times past when the operating panel 103 accepts the change of the set content of the predetermined set item, the main control portion 110 determines that the second condition is met, and permits the change of the set content of the predetermined set item (i.e., the flow goes from the step S22 to the step S23).

In the third embodiment, as described above, when the accepting portion 103 accepts the change of the set content of the predetermined set item, the main control portion 110 checks the execution history of the facsimile communications that were executed in times past, and in a case where a communication error had occurred in the facsimile communication executed immediately before the accepting portion accepted the change of the set content of the predetermined set item, or in a case where the communication errors had occurred successively by the predetermined number of times before the communication error occurred in the facsimile communication executed immediately before the accepting portion accepted the change of the set content of the predetermined set item, the main control portion 110 determines that the second condition is met and permits the change of the set content of the predetermined set item.

In the structure of the third embodiment, in the case where it is found out that a communication error occurred in the facsimile communication executed immediately before the change of the set content of the predetermined set item is accepted, the change of the set content of the predetermined set item is permitted. Here, in the case where a communication error occurred in the facsimile communication executed immediately before the change of the set content of the predetermined set item is accepted, it is highly likely that the set content of the predetermined set item is incorrect. Accordingly, in this case, to eliminate the communication error (to change the incorrect set content of the predetermined set item to the correct one), the change of the set content of the predetermined set item is permitted. In this way, it is possible to alleviate the occurrence of a communication error caused by the incorrect set content of the predetermined set item.

In the meantime, a communication error occurs in a case as well where there is a miss-input of a fax number. In other words, even if a communication error occurs, there is a case where a communication error does not occur after the correct fax number is input. In this case, it is not necessary to change the set content of the predetermined set item. But, if the set content of the predetermined set item is incorrect, a communication error continues to occur even after the correct fax number is input. Because of this, in the case where it is found out that a plurality of communication errors had occurred successively before a communication error occurred in the facsimile communication executed immediately before the change of the set content of the predetermined set item is accepted, it is more desirable that the change of the set content of the predetermined set item is permitted.

Besides, in the third embodiment, as described above, in the case as well where it is found out that the facsimile communication was not executed in times past when the operating panel 103 accepts the change of the set content of the predetermined set item, the main control portion 110 determines that the second condition is met, and permits the change of the set content of the predetermined set item. According to this structure, when the set content of the predetermined set item is changed from the default based on the agreement on the telephone line after the multi-function machine 100 is delivered (before the first facsimile communication is executed), it is possible to alleviate occurrence of a disadvantage that the user cannot change the set content of the predetermined set item and is confused.

Besides, in the third embodiment, as described above, when the main control portion 110 determines that the second condition is not met, the main control portion 110 does not permit the change of the set content of the predetermined set item, and forces the operating panel 103 to display the change non-permission information CI (notification screen 103C) for notifying that the change of the set content of the predetermined set item is not permitted. According to this structure, it is possible to alleviate occurrence of a disadvantage that the set content is changed to incorrect one even if the set content of the predetermined set item is correct.

It should be considered that the embodiments disclosed this time are examples in all respects and are not limiting. The scope of the present invention is not indicated by the above description of the embodiments but by the claims, and all modifications within the scope of the claims and the meaning equivalent to the claims are covered.

What is claimed is:

1. A facsimile apparatus comprising:
an acceptor that accepts setting of a set content relevant to facsimile communication,
a communicator that executes the facsimile communication,
a controller that controls the facsimile communication executed by the communicator and determines whether a communication error occurs during an execution time of the facsimile communication or not, a history information storage that stores history information which indicates an execution history of the facsimile communication, and a display that displays information, wherein when the acceptor accepts a change of a set content of a predetermined set item that is a set item which makes it impossible to perform the facsimile communication if the set content is incorrect, the controller checks an execution history of the facsimile communication that was executed in times past, and in a case where the communication errors had occurred successively by a predetermined number of times before the communication error occurred in the facsimile communication executed immediately the before the acceptor accepts the change of the set content of the predetermined set item, the controller determines that a predetermined condition is met and permits the change of the set content of the predetermined set item, the predetermined set item is one of line set, dial-in set, and dial number display set the line set is a set item for setting a kind of a dial signal sent to an exchange, the dial-in set is a set item for setting whether or not to execute a dial-in process when receiving facsimile data, and the dial number display set is a set item for setting whether or not to execute a dial number display process when receiving facsimile data.

2. The facsimile apparatus according to claim 1, wherein even in a case where it is found out that the facsimile communication was not executed in times past when the acceptor accepts the change of the set content of the predetermined set item, the controller determines that the predetermined condition is met and permits the change of the set content of the predetermined set item.

3. The facsimile apparatus according to claim 1, wherein when the controller determines that the predetermined condition is not met, the controller does not permit the change of the set content of the predetermined set item and forces the display portion to display change non-permission information for notifying that the change of the set content of the predetermined set item is not permitted.

* * * * *